(12) United States Patent
Ono

(10) Patent No.: US 6,775,021 B1
(45) Date of Patent: *Aug. 10, 2004

(54) DATA COMMUNICATION APPARATUS FOR RECEIVING AND RECORDING DATA AND HAVING MEANS FOR ADDING A PREDETERMINED MARK AND A TIME OF RECEPTION TO THE RECORDED DATA

(75) Inventor: Takeshi Ono, Kawasaki (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/228,406

(22) Filed: Jan. 12, 1999

Related U.S. Application Data

(62) Division of application No. 08/541,177, filed on Oct. 11, 1995, which is a division of application No. 08/347,234, filed on Nov. 23, 1994.

(30) Foreign Application Priority Data

Nov. 26, 1993 (JP) .............................................. 5-320984

(51) Int. Cl.[7] ................................................ H04N 1/00
(52) U.S. Cl. ..................... 358/1.15; 358/1.18; 358/439; 358/468
(58) Field of Search ................................ 358/400, 404, 358/434–436, 438–442, 468, 444, 1.15, 1.17, 1.4, 1.1, 1.18; 350/440, 402; H04N 1/21, 1/32

(56) References Cited

U.S. PATENT DOCUMENTS

| | | | |
|---|---|---|---|
| 3,657,744 A | 4/1972 | Ersek | ................................. 3/1 |
| 4,419,697 A | * 12/1983 | Wada | .......................... 358/257 |
| 4,503,569 A | 3/1985 | Dotter | .............................. 3/14 |

(List continued on next page.)

FOREIGN PATENT DOCUMENTS

| | | | |
|---|---|---|---|
| EP | A453222 | 10/1991 | |
| EP | 480593 A2 | 4/1992 | |
| EP | 519253 A2 | 12/1992 | |
| EP | A530533 | 3/1993 | |
| EP | 0 566 807 A1 | 10/1993 | ............. A61F/2/06 |
| EP | 0 662 307 A1 | 7/1995 | ............. A61F/2/06 |
| JP | 5473510 | 6/1979 | |
| JP | 5546604 | 4/1980 | |
| JP | 55115771 | 9/1980 | |

OTHER PUBLICATIONS

Licwinko et al., "AT&T Fax Products and Services Speed the Written Message", AT&T Technology, vol. 4, No. 2, Jan. 1, 1989, pp. 12–17.

Stanley, R. Michael "Automatic Selectable Cover Sheet Avoidance for Network Printers", Xerox Disclosure Journal, vol. 18, No. 5, pp. 491–492, XP 000404397, Stamford, CT., Sep. 1993–Oct. 1993.

Patent Abstracts of Japan, vol. 17, No. 188 (JP–A–04335753), Nov. 1992.

*Primary Examiner*—Edward Coles
*Assistant Examiner*—Joseph R. Pokrzywa
(74) *Attorney, Agent, or Firm*—Fitzpatrick, Cella, Harper & Scinto

(57) ABSTRACT

A facsimile apparatus having a printer interface and a recorder unit usable as a printer, includes an image memory for storing facsimile image data received during an operation as the printer, a key switch for switching an operation mode between a facsimile mode and a printer mode by a switching operation, and a controller for automatically causing the recorder unit to perform an output operation such that the image data stored in the image memory in the printer mode is read out to print received image information by the switching operation of the key switch to the facsimile mode when the facsimile image data is received in the printer mode.

4 Claims, 7 Drawing Sheets

U.S. PATENT DOCUMENTS

| | | | | |
|---|---|---|---|---|
| 4,506,111 A | * | 3/1985 | Takenouchi et al. | 179/2 A |
| 4,553,545 A | | 11/1985 | Maass et al. | 128/341 |
| 4,573,083 A | | 2/1986 | Shimizu | 358/407 |
| 4,580,568 A | | 4/1986 | Gianturco | 128/345 |
| 4,587,633 A | * | 5/1986 | Wang et al. | 364/900 |
| 4,681,110 A | | 7/1987 | Wiktor | 128/343 |
| 4,733,665 A | | 3/1988 | Palmaz | 128/343 |
| 4,772,955 A | | 9/1988 | Kurahayashi et al. | 358/257 |
| 4,776,337 A | | 10/1988 | Palmaz | 128/343 |
| 4,795,458 A | | 1/1989 | Regan | 623/1 |
| 4,862,254 A | | 8/1989 | Takada | 358/434 |
| 4,870,503 A | * | 9/1989 | Miura | 358/256 |
| 4,886,062 A | | 12/1989 | Wiktor | 128/343 |
| 4,907,094 A | | 3/1990 | Mishima et al. | 358/437 |
| 4,908,714 A | * | 3/1990 | Iriyama et al. | 358/405 |
| 4,991,200 A | * | 2/1991 | Lin | 379/100 |
| 5,019,916 A | | 5/1991 | Ogura | 358/401 |
| 5,021,892 A | | 6/1991 | Kita et al. | 358/468 |
| 5,090,049 A | * | 2/1992 | Chen | 379/100 |
| 5,091,790 A | * | 2/1992 | Silverberg | 358/434 |
| 5,102,417 A | | 4/1992 | Palmaz | 606/195 |
| 5,133,732 A | | 7/1992 | Wiktor | 606/195 |
| 5,135,536 A | | 8/1992 | Hillstead | 606/195 |
| 5,153,737 A | | 10/1992 | Kobayashi | 358/296 |
| 5,192,307 A | | 3/1993 | Wall | 623/1 |
| 5,195,984 A | | 3/1993 | Schatz | 606/195 |
| 5,200,830 A | * | 4/1993 | Imaizumi et al. | 358/442 |
| 5,220,438 A | * | 6/1993 | Yamamoto | 358/404 |
| 5,247,591 A | * | 9/1993 | Baran | 382/61 |
| 5,266,073 A | | 11/1993 | Wall | 623/1 |
| 5,266,996 A | | 11/1993 | Wakamiya et al. | 358/437 |
| 5,269,802 A | | 12/1993 | Garber | 606/191 |
| 5,278,666 A | * | 1/1994 | Satomi et al. | 358/405 |
| 5,280,366 A | * | 1/1994 | Araki | 358/453 |
| 5,280,585 A | * | 1/1994 | Kochis et al. | 710/48 |
| 5,283,665 A | * | 2/1994 | Ogata | 358/434 |
| 5,290,305 A | | 3/1994 | Inoue | 606/191 |
| 5,316,023 A | | 5/1994 | Palmaz et al. | 128/898 |
| 5,341,377 A | * | 8/1994 | Ohtani | 370/110.1 |
| 5,349,447 A | * | 9/1994 | Kuwahara et al. | 358/404 |
| 5,384,830 A | * | 1/1995 | Ide | 379/67 |
| 5,410,419 A | * | 4/1995 | Muramatsu et al. | 358/468 |
| 5,421,955 A | | 6/1995 | Lau et al. | 216/48 |
| 5,443,498 A | | 8/1995 | Fontaine | 623/1 |
| 5,443,500 A | | 8/1995 | Sigwart | 623/1 |
| 5,496,365 A | | 3/1996 | Sgro | 623/1 |
| 5,514,154 A | | 5/1996 | Lau et al. | 606/195 |
| 5,527,354 A | | 6/1996 | Fontaine et al. | 623/1 |
| 5,569,295 A | | 10/1996 | Lam | 606/198 |
| 5,591,197 A | | 1/1997 | Orth et al. | 606/198 |
| 5,603,721 A | | 2/1997 | Lau et al. | 606/195 |
| 5,607,442 A | | 3/1997 | Fischell et al. | 606/191 |
| 5,621,540 A | * | 4/1997 | Terajima | 358/468 |
| 5,633,932 A | * | 5/1997 | Davis et al. | 380/25 |
| 5,643,312 A | | 7/1997 | Fischell et al. | 606/198 |
| 5,650,804 A | * | 7/1997 | Kawamura et al. | 347/19 |
| 5,669,936 A | | 9/1997 | Lazarus | 623/1 |
| 5,733,303 A | | 3/1998 | Israel et al. | 606/198 |
| 5,807,404 A | | 9/1998 | Richter | 623/1 |
| 5,836,964 A | | 11/1998 | Richter et al. | 606/194 |
| 5,910,848 A | | 6/1999 | Ono | 358/404 |
| 5,914,789 A | * | 6/1999 | Murata | 358/468 |
| 5,956,466 A | * | 9/1999 | Horiuchi et al. | 395/109 |

\* cited by examiner

DATA COMMUNICATION APPARATUS FOR RECEIVING AND RECORDING DATA AND HAVING MEANS FOR ADDING A PREDETERMINED MARK AND A TIME OF RECEPTION TO THE RECORDED DATA

This application is a division of application Ser. No. 08/541,177 filed Oct. 11, 1995, which in turn is a division of application Ser. No. 08/347,234 filed Nov. 23, 1994.

BACKGROUND OF THE INVENTION

1. Field of the Invention

The present invention relates to a facsimile apparatus having a memory reception faculty.

2. Related Background Art

A facsimile apparatus having a printer interface and a recorder unit independently usable as a printer is known. According to the facsimile apparatus of this type, printing of an external data signal other than a facsimile image signal can be independently performed. This makes various faculties available, so that the apparatus can be used in a variety of applications.

On the other hand, a facsimile apparatus having an image memory for storing received image data is also known. In this facsimile apparatus, when facsimile image data is received in a memory reception mode, the received image data is temporarily stored in the image memory. A recorder unit prints the received image on the basis of the received image data read out from the image memory. According to the facsimile apparatus of this type, when the recorder unit is in a recording disable state due to, e.g., a lack of recording paper, the received data is stored in the image memory without stopping the receiving operation. After the recording faculty of the recorder unit is recovered by replenishment of the recording paper, the received data can be read out from the image memory and printed.

In the facsimile apparatus having the recorder unit independently usable as a printer, facsimile information cannot be received when the recorder unit is used as the printer. An alarm is generated to inform the sender that the apparatus is in use. For this reason, urgent facsimile information cannot be received, resulting in inconvenience.

Additionally, in the facsimile apparatus having the memory reception mode for temporarily storing the received image data in the image memory upon reception of facsimile image data, the facsimile image data received during printing is recorded in the memory. The received facsimile image read out from the memory is output after the end of printing. Therefore, the facsimile image reception time may be largely different from the image recording time. If a large time lag is present between reception of the facsimile image and setting of the recorder unit in a recording enable state, much time is needed from reception of the facsimile information to recording of the information. Since a printer output image and a facsimile output image are simultaneously obtained, a time relationship between the two output images cannot be grasped in processing, resulting in inconvenience. In a general facsimile apparatus, a sending time is added to facsimile information on the sender side. Facsimile apparatuses in which a reception time is added to facsimile information on the receiver side have also been widely used. However, there is no facsimile apparatus yet in which both the reception time and a read/recording time are added on the receiver side. As a result, it is difficult to discriminate a printer output image from a facsimile output image.

In such a multi-faculty facsimile apparatus, it is commonly required to switch operations of different faculties with a simple operation without any error, thereby preventing an operator from being confused in processing of recording data.

SUMMARY OF THE INVENTION

The present invention has been made in consideration of the above situation of a facsimile apparatus, and has as its first object to provide a facsimile apparatus capable of appropriately performing processing with a simple operation without any error when reception of facsimile information and printing of a recorder unit are simultaneously performed.

The present invention has as its second object to provide a facsimile apparatus capable of grasping the time situation of processing facsimile information without any extra operation when reception of the facsimile information and printing of a recorder unit are simultaneously performed.

DETAILED DESCRIPTION OF THE PREFERRED EMBODIMENTS

First Embodiment

Figure 1:
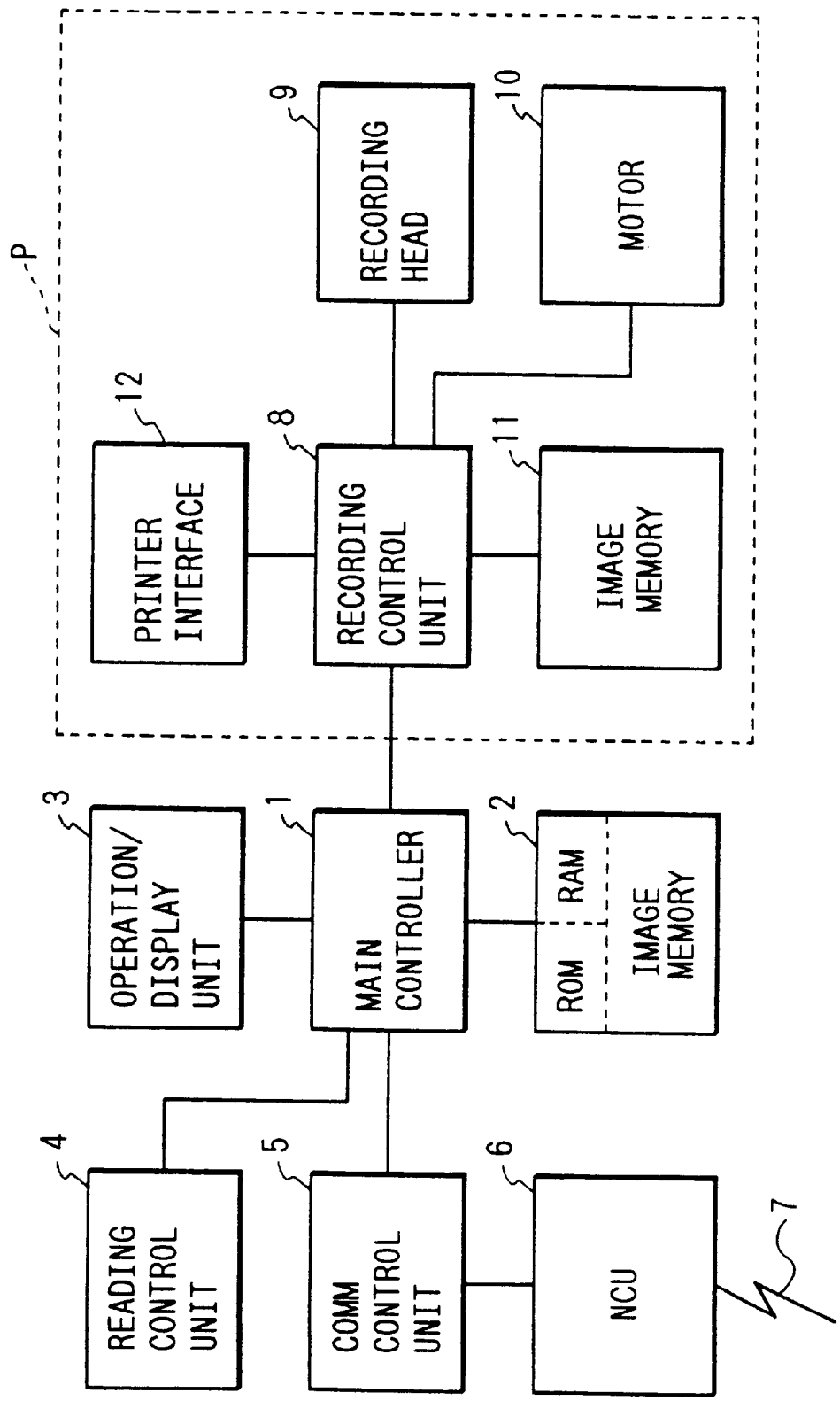
FIG. 1 is a block diagram schematically showing the arrangement of the first embodiment of the present invention.
Figure 2:
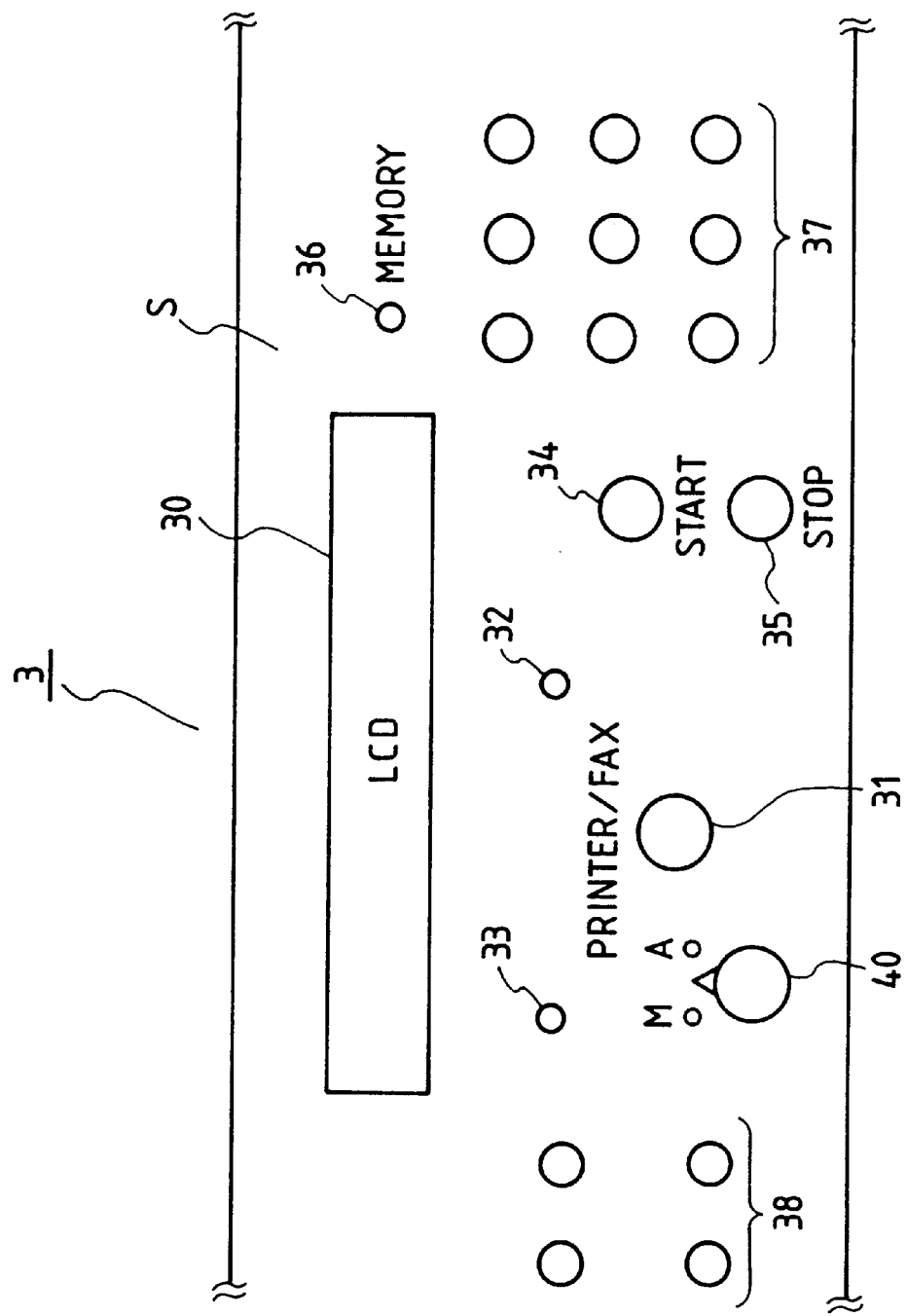
FIG. 2 is an explanatory view showing the arrangement of an operation/display unit in FIG. 1.
Figure 3:
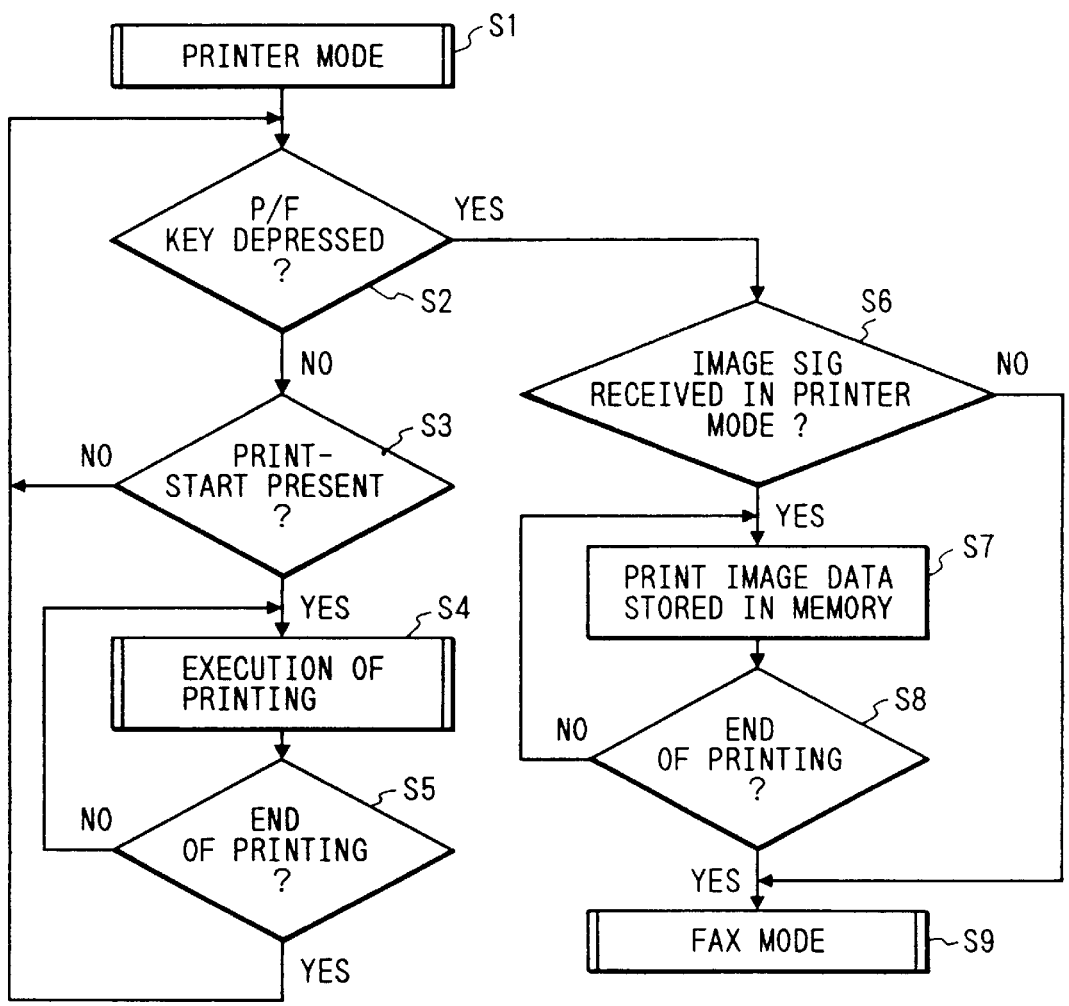
FIG. 3 is a flow chart showing an operation in an automatic recording mode of the first embodiment.
Figure 4:
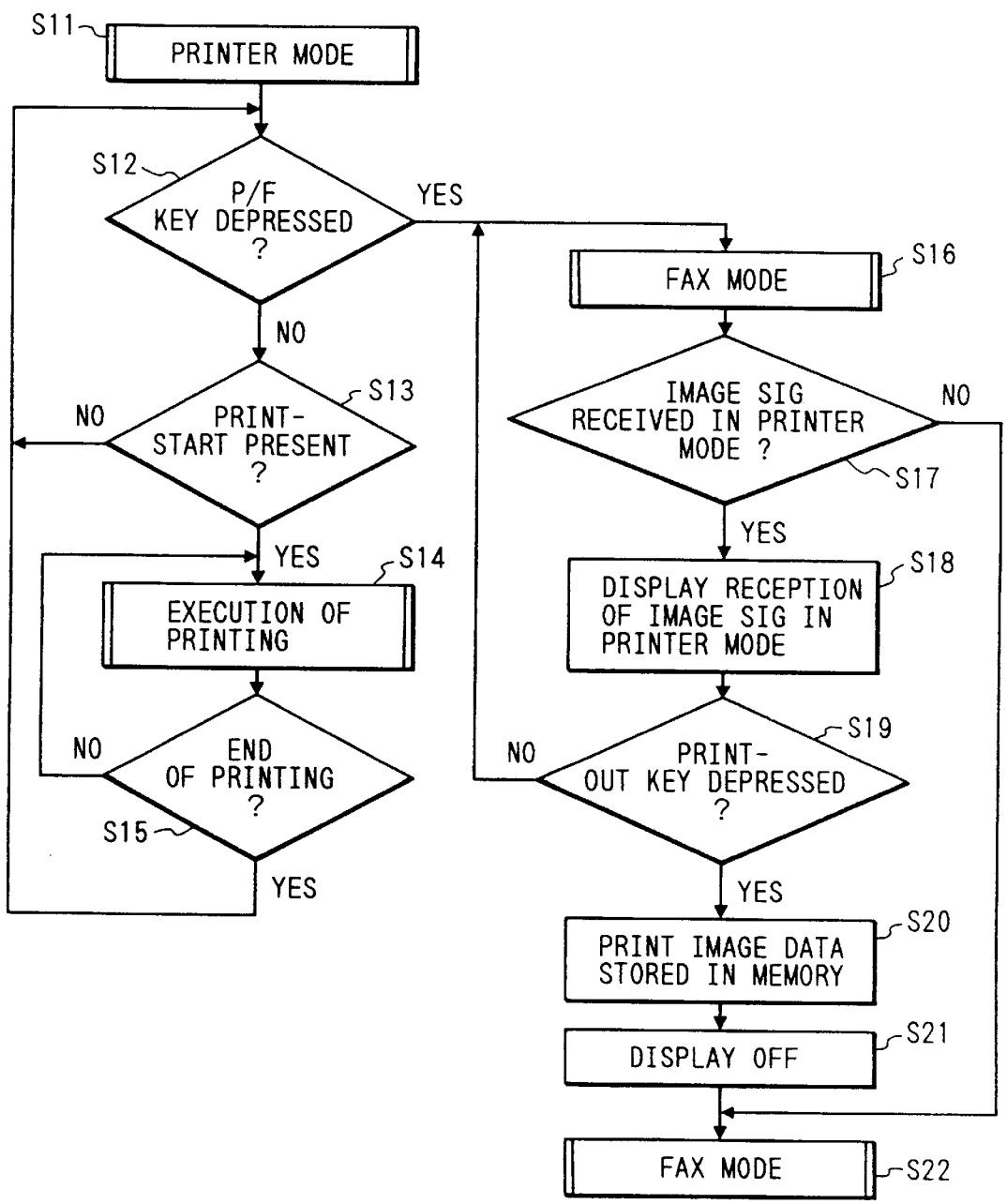
FIG. 4 is a flow chart showing an operation in a normal recording mode of the first embodiment.

An embodiment of the present invention will be described below with reference to the accompanying drawings. The first embodiment will be described with reference to FIGS. 1 to 4. FIG. 1 is a block diagram schematically showing the arrangement of this embodiment. FIG. 2 is an explanatory view showing the arrangement of an operation/display unit in FIG. 1. FIG. 3 is a flow chart showing an operation in an automatic recording mode of this embodiment. FIG. 4 is a flow chart showing an operation in a normal recording mode of this embodiment.

In this embodiment, as will be described below, a facsimile mode for performing transmission/reception of facsimile image data and a printer mode for printing an external signal by a recorder unit can be switched. When a facsimile image signal is received in the printer mode, the image signal is stored in an image memory. In correspondence with the use conditions of the apparatus, an automatic recording mode and a normal recording mode can be switched.

Referring to FIG. 1, a main controller (CPU) 1 controls the entire operation. The main controller 1 has an operation/display unit 3 with an LCD and a key switch, a reading control unit 4 for conveying an original and reading the original by a device such as a CCD, a ROM, a RAM, and an image memory. The image memory is connected to a memory 2 for storing image data received in the printer mode and image data read by the reading control unit 4 during transmission or printing of the original. Similarly, a communication control unit 5 having a modem is connected to the main controller 1. The communication control unit 5 is connected to an NCU (network control unit) 6 connected to a line 7. With this arrangement, during transmission of facsimile image data, image data read by the reading control unit 4 is sent through the NCU via the line 7 in accordance with a command from the main controller 1 under the control of the communication control unit 5. During reception of facsimile image data, in accordance with a command from the main controller 1, image data is received from the line 7 through the NCU 6. In the facsimile mode, the received image data is printed by a recorder unit P (to be described later). In the printer mode, the received image data is stored in the image memory of the memory 2.

A recording control unit 8 is connected to the main controller 1. The recording control unit 8 is connected to a recording head 9, a motor 10, an image memory 11 for storing an input image during printing or rearranging image data in accordance with the number of dots of the head, and a printer interface 12. The recorder unit P is constituted by the recording control unit 8, the printer interface 12, the recording head 9, the motor 10, and the image memory 11.

The recording control unit 8 has a faculty of controlling the recording head 9 serving as a recording device and a faculty of controlling the motor 10 for conveying recording paper. If the recorder unit has a recording head of a semi-multi head type for repeatedly scanning an original in a main scanning direction, a carriage motor for moving the head is controlled. The printer interface 12 is constituted by, e.g., a centronics connector. In the printer mode wherein the recorder unit P is used as a printer for an external signal, the recorder unit P is connected to an external terminal such as a personal computer through the printer interface 12. An input signal is stored in the image memory 11 while the printing operation is performed.

As shown in FIG. 2, in the operation/display unit 3, an LCD 30 for displaying various information such as the mode or state of the apparatus and a message to an operator is arranged at the upper central portion of a panel S. A key switch (P/F key) 31 for switching between the printer mode and the facsimile mode is provided below the LCD 30. LEDs 33 and 32 turned on upon switching between the printer mode and the facsimile mode are arranged near the P/F key 31.

A recording mode selection switch 40 for selecting the automatic recording mode or the normal recording mode is provided on one side of the P/F key 31. A start key 34 is provided on the other side of the P/F key 31. The start key 34 is operated at the time of transmission or the start of printing in the facsimile mode. If the start key 34 is operated in a state wherein no original is set in the apparatus, and image data is stored in the image memory, reading of the image data stored in the image memory is started. A stop key 35 for stopping the operation of the apparatus is arranged below the start key 34. Operation keys 38 operated in the printer mode and operation keys 37 operated in the facsimile mode are respectively arranged at two end portions of the panel S. An LED 36 turned on upon storing image data in the image memory is arranged above the operation keys 37.

(Automatic Recording Mode)

An operation in the automatic recording mode of this embodiment with the above arrangement will be described below with reference to FIG. 3.

In this case, the recording mode selection switch 40 is switched to a switching terminal A side to set the automatic recording mode in the apparatus.

In step S1, the printer mode is set by the P/F key 31, and the recorder unit P is set in the printing enable state. In this state, the recorder unit P is connected to an external terminal such as a personal computer through the printer interface 12. When an input signal is generated, the input signal is stored in the image memory 11, and printing is performed on the basis of the input signal data stored in the image memory 11. If the apparatus is connected to a communication line, and a facsimile image signal is received during printing, the facsimile image signal is received. So-called delayed delivery or acting reception is performed such that the received data is accumulated in the image memory of the memory 2 by the main controller 1. In step S2, the main controller 1 determines whether the P/F key 31 is depressed. If NO in step S2, the flow advances to step S3, and the main controller 1 determines whether print-start of the input signal from the external terminal is present. If NO in step 1 S3, the flow returns to step S2 to execute the same operation (operation of determining whether the P/F key is depressed). If YES in step S3, the flow advances to step S4 to execute printing. The operation in step S4 is continued until the main controller 1 determines end of printing in step S5. When the operation is ended, the flow returns to step S2.

In step S2, if the main controller 1 determines that the P/F key 31 is switched to the facsimile mode, the flow advances to step 56. The main controller 1 determines whether a facsimile image signal is received in the printer mode. If NO in step S6, the flow advances to step S9 to set the apparatus in a stand-by state in the facsimile mode.

If YES in step S6, the flow advances to step S7. The main controller 1 reads out the image data stored in the image memory of the memory 2. The image data is transferred to the recording control unit 8, and printing of the image data is executed by the recorder unit P under the control of the recording control unit 8. Reading/printing of the image data is executed until the main controller 1 determines the end of printing in step S8. If the end of printing is determined in step S8, the flow advances to step S9 to set the apparatus in the stand-by state in the facsimile mode.

(Normal Recording Mode)

An operation in the normal recording mode of this embodiment with the above arrangement will be described below with reference to FIG. 4.

In this case, the recording mode selection switch 40 is switched to a switching terminal B side to set the normal recording mode in the apparatus.

The operation from step S11 to step S15 in the normal recording mode is the same as that from step S1 to step S5, which has been already described with reference to FIG. 3, and a detailed description thereof will be omitted.

In step S12, if the main controller 1 determines that the P/F key 31 is switched to the facsimile mode, the flow advances to step S16 to set the facsimile mode. The flow then advances to step S17, and the main controller 1 determines whether a facsimile image signal is received in the printer mode. If NO in step S17, the flow advances to step S22 to set the apparatus in the stand-by state in the facsimile mode.

If YES in step S17, a message for informing reception of the facsimile image signal in the printer mode, e.g., "delayed delivery was performed" or "please output the image received in the printer mode" is displayed on the LCD 30 in step S18, and at the same time, the LED 36 is turned on. The operator checks display on the LCD 30 or the ON state of the LED 36 and then operates the start key 34 in step S19. The flow advances to step S20, and the main controller 1 reads out the image data stored in the image memory of the memory 2. The image data is transferred to the recording control unit 8, and printing of the image data is executed by the recorder unit P under the control of the recording control unit 8. The display on the LCD 30 is turned off in step S21, and at the same time the LED 36 is turned off. The flow advances to step S22 to set the apparatus in the stand-by state in the facsimile mode.

As described above, according to the first embodiment, in the automatic recording mode, by only switching the key switch 31 to the facsimile mode, the facsimile image data received in the printer mode is read out from the image memory of the memory 2 and automatically printed by the recorder unit P. For this reason, the facsimile image information received in the printer mode can be properly and quickly printed. In the normal recording mode, when the key switch 31 is switched to the facsimile mode, and thereafter, the facsimile image signal is received in the printer mode, the operation to be subsequently performed is displayed. When the start key 34 is operated in accordance with the display, the facsimile image data received in the printer mode is read from the image memory of the memory 2 and printed by the recorder unit P. For this reason, the operation is simple for the user. Particularly, when a plurality of operators use the same apparatus, appropriate processing can be performed without confusing facsimile information with printer information.

In the first embodiment, the image memory (memory 2) in the facsimile mode and the image memory (image memory 11) in the printer mode are separately provided. However, a common memory can also be used.

Second Embodiment

Figure 5:
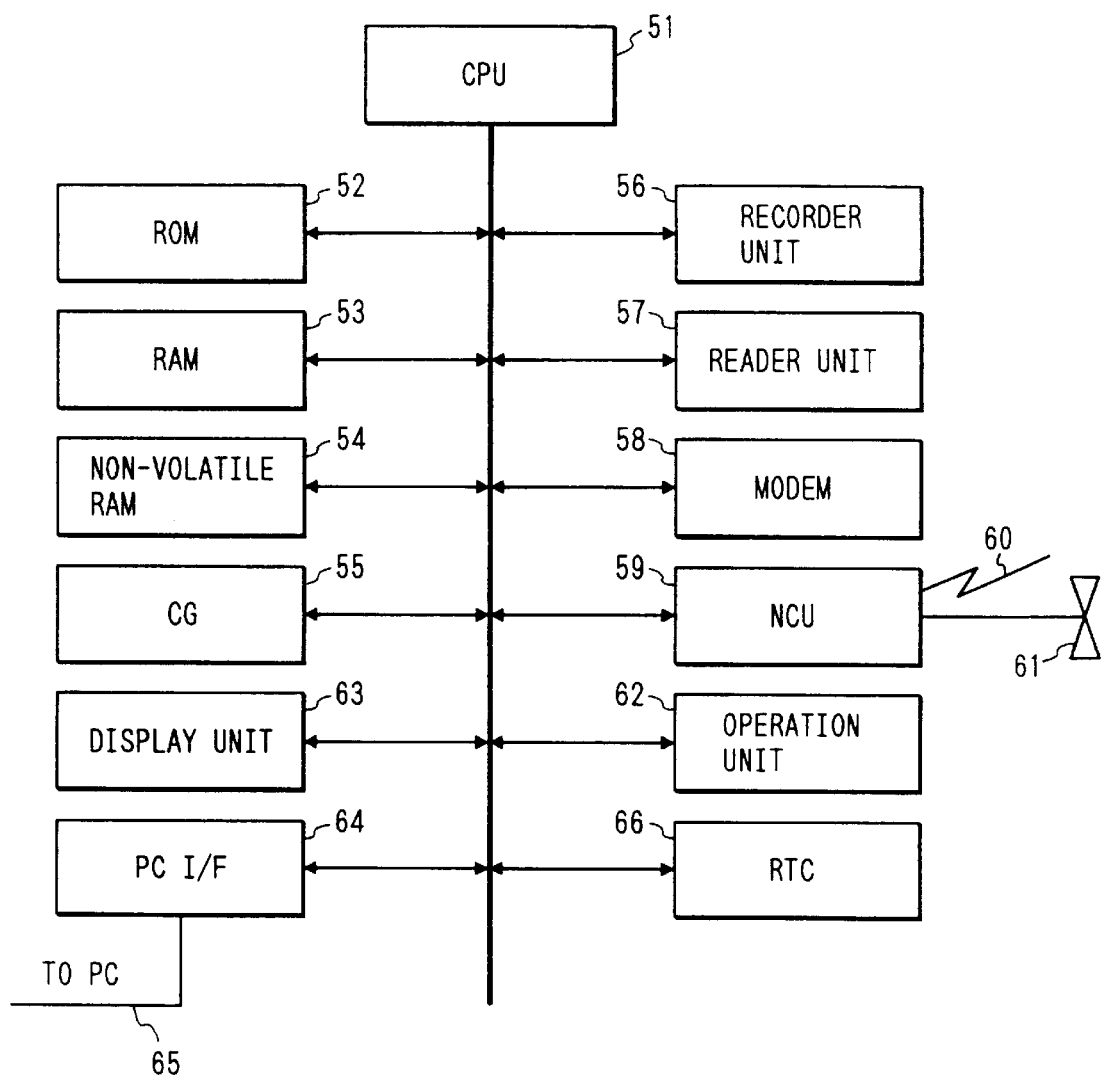
FIG. 5 is a block diagram showing the arrangement of the second embodiment of the present invention.
Figure 6:
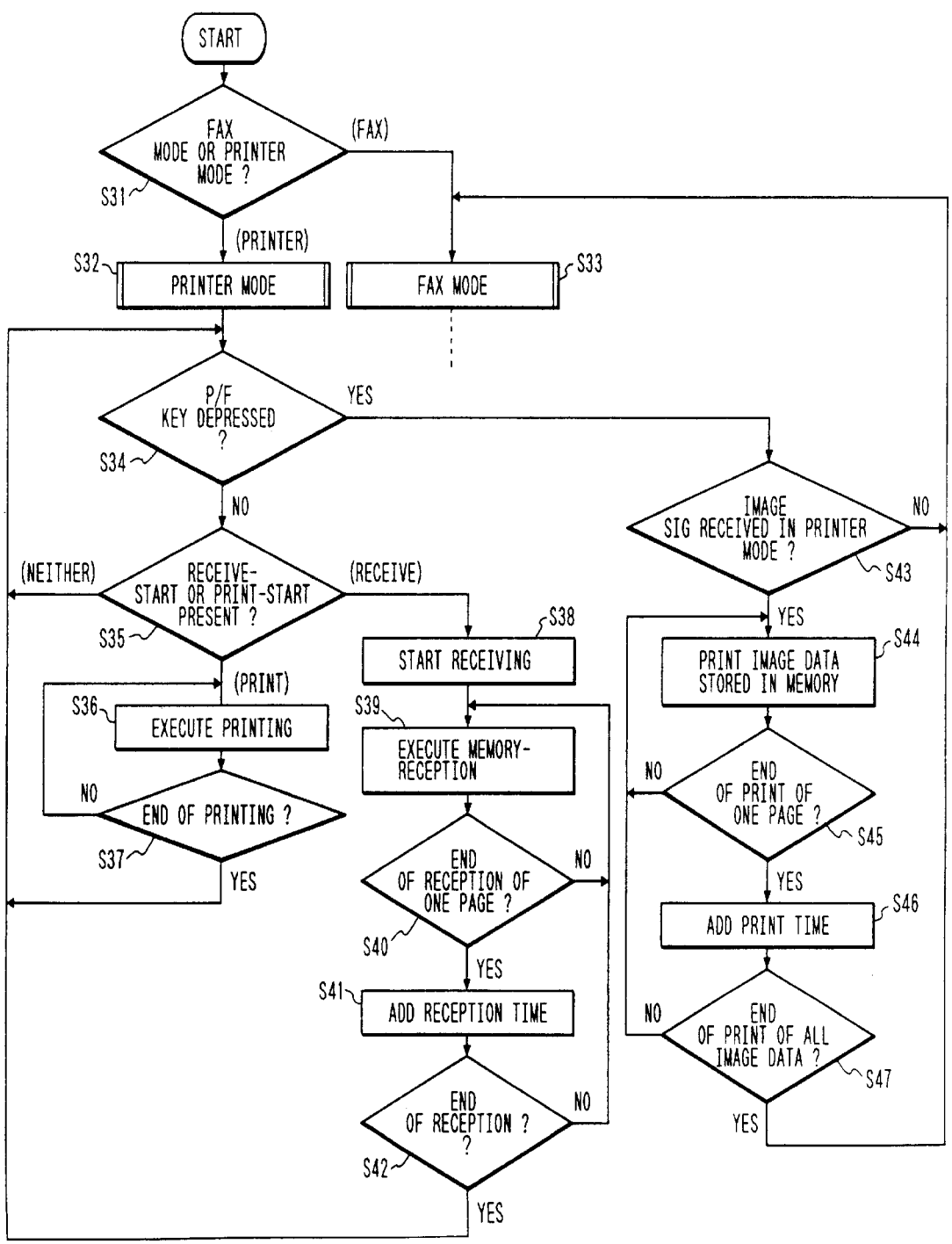
FIG. 6 is a flow chart showing the operation of the second embodiment.
Figure 7:
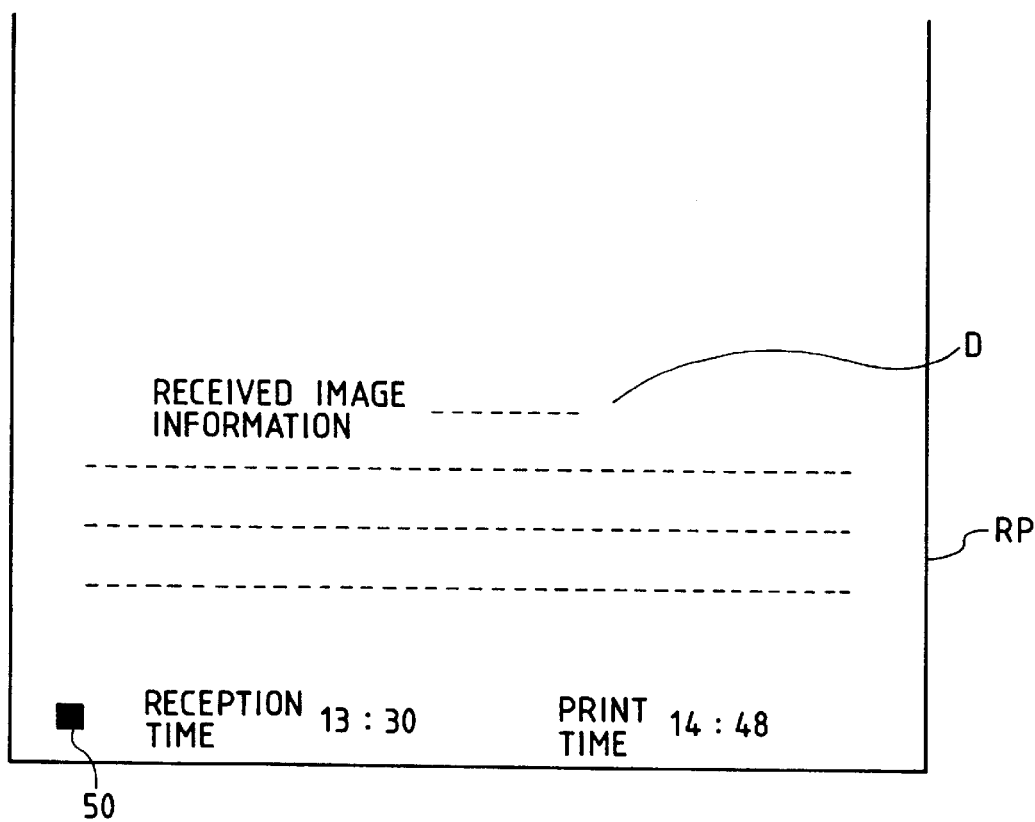
FIG. 7 is an explanatory view showing the recorded image of the second embodiment.

The second embodiment of the present invention will be described below with reference to FIGS. 5 to 7. FIG. 5 is a block diagram showing the arrangement of this embodiment. FIG. 6 is a flow chart showing the operation of this embodiment. FIG. 7 is an explanatory view of the recorded image of this embodiment.

In this embodiment, as will be described below, an image memory for storing received image data is arranged, and facsimile image data received in a memory reception mode is temporarily stored in the image memory.

As shown in FIG. 5, in this embodiment, a CPU 51 for controlling the entire operation is connected to a ROM 52 for storing a control program, a RAM 53 for storing various data during an operation, from which various data is read out during the operation, and a recorder unit 56. The recorder unit 56 is constituted by a DMA controller, an ink-jet printer, and a printer control signal generation circuit. The recorder unit 56 has a faculty of extracting recording data stored in the RAM 53 in accordance with a command from the CPU 51 and printing the data as a hard copy. The RAM 53 has a faculty of storing binary image data read by a reader unit 57 (to be described later), binary image data recorded by the recorder unit 56, binary image data modulated by a modem 58 (to be described later) and output to a telephone line, binary data received from the telephone line through an NCU 59 (to be described later) and demodulated by the modem 58, and the binary data of an input signal from an external terminal through an interface unit 64.

The reader unit 57 is also connected to the CPU 51. The reader unit 57 is constituted by a DMA controller, an image processing IC, an image sensor, and a sensor control signal generation circuit. The reader unit 57 has a faculty of binarizing data read by the image sensor by the image processing IC and sequentially supplying the obtained binary data to the RAM 53 in accordance with a command from the CPU 51. The filled state of an original read by the reader unit 57 is detected by an original sensor provided in the original convey path, and an original detection signal is input to the CPU 51.

A non-volatile RAM 54 for properly storing data which need be saved even in the powered-off state of the apparatus, a character generator 55 (CG), and a display unit 63 are also connected to the CPU 51. The character generator 55 has a faculty of storing character fonts and extracting a character corresponding to a predetermined code as needed. As the display unit 63, an LCD for displaying various data, which can display characters of 16 digits at maximum, is connected. The interface unit 64 for receiving print data from an external computer (PC) through an interface cable 65 is also connected to the CPU 51.

The CPU 51 is also connected to the modem 58 constituted by a G3 modem and a control signal generating unit. In accordance with a command from the CPU 51, the modem 58 modulates transmission data stored in the RAM 53, outputs the data to a telephone line 60 through the NCU 59 (to be described later), receives an analog signal from the telephone line through the NCU, and stores binary data obtained upon demodulation of the signal in the RAM 53. The NCU 59 for connecting the telephone line 60 to the modem 58 or a telephone set 61 in accordance with a command from the CPU 51 is also connected to the CPU 51. The NCU 59 is connected to the modem 58 and the telephone set 61 having a handset, a speech network, a dialer, a ten-key pad, and a one-touch key and integrally constituted with the facsimile apparatus main body.

The CPU 51 is also connected to an operation unit 62 and a real-time clock 66 for counting a time. The operation unit 62 has a printer mode/facsimile mode switching key, a key for starting image transmission/reception, a key for selecting an operation mode such as fine/standard and manual/automatic reception in transmission/reception, and a ten-key pad for dialing. The operating states of these keys are detected by the CPU 51.

The CPU 51 of this embodiment sets the memory reception mode when the recorder unit 56 becomes inoperable because of a lack of recording paper or the like, or when the apparatus is set in the printer mode. In the memory reception mode, when a facsimile image signal is received, delayed delivery is performed such that the received image signal is stored in the RAM 53 serving as an image memory.

The operation of this embodiment with the above arrangement will be described below with reference to FIGS. 6 and 7.

As shown in FIG. 6, in step S31, the CPU 51 determines whether the apparatus is set in the printer mode or facsimile mode. If the apparatus is set in the facsimile mode, the flow advances to step S33 to set the apparatus in a stand-by state in the facsimile mode. If the printer mode is determined in step S31, the flow advances to step S32 to set the apparatus in the stand-by mode in the printer mode. In this case, a wait state is set such that the apparatus can operate as a printer upon access from the personal computer PC or the like. If a facsimile image signal is received in the printer mode, delayed delivery to the RAM 53 is performed. The apparatus of this embodiment can also perform transmission in the printer mode.

The flow advances to step S34, and the CPU 51 determines whether the printer/facsimile switching key (P/F key) is depressed. If NO in step S34, the flow advances to step S35, and the CPU 51 determines whether receive-start or print-start is present in the printer mode. If neither are present, the flow returns to step S34. If it is determined that print-start is present in step S35, the flow advances to step S36 to execute printing. If the CPU 51 determines the end of printing in step S37, the flow returns to step S34. If the CPU 51 determines in step S35 that receive-start of a facsimile image signal is present, the flow advances to step S38 to start memory delayed delivery in accordance with a command from the CPU 51. In step S39, delayed delivery is performed to store the received image in the RAM 53.

If the CPU 51 determines the end of delayed delivery of one page in step S40, the flow advances to step S41. Characters corresponding to a time read from the real-time clock 66 is received from the character generator 55 in accordance with a command from the CPU 51. When data of one page obtained upon demodulating and binarizing the received image data is to be stored in the RAM 53, the time information is added to the end of the page. The flow advances to step S42, and if the CPU 51 determines the end of reception, the flow returns to step S34. If the end of reception is not determined in step S42, the flow returns to step S39 to repeat the same processing, thereby storing image information with a reception time added to each page in the RAM 53.

On the other hand, if YES In step S34, the flow advances to step S43 to determine whether a facsimile image signal is received in the printer mode. If NO in step S43, the flow advances to step S33 to set the apparatus in the stand-by state in the normal facsimile mode. If YES in step S43, the flow advances to step S44 in which the image data received in the printer mode and stored in the RAM 53 is read in accordance with a command from the CPU 51, and the image data is printed by the recorder unit 56. If the CPU 51 determines the end of print of one page in step S45, characters corresponding to a time read from the real-time clock 66 are received from the character generator 55 in accordance with a command from the CPU 51 in step S46. The print time data is added to the end of one page. In this manner, the print image with the print time data added to each page is formed until the CPU 51 determines the end of read/print of all image data in step S47. If print of all image data is ended, the flow returns to step S33 to set the apparatus in the stand-by state in the facsimile mode.

The print result of the received image formed in the above manner is shown in FIG. 7. A footer mark 50 for detecting the presence/absence of an ink is added to the end of received image information D printed on recording paper RP. The reception time information and the print time information are printed to be aligned with the footer mark 50 in the same row. With this footer mark 50, a printer image can be clearly discriminated from a facsimile image, thereby providing confusion therebetween.

As described above, according to the second embodiment, when the image data received in the memory reception mode is to be stored in the RAM 53, reception time data read from the character generator 55 in correspondence with the time of the real-time clock 66 is added to the to-be-stored image data in accordance with a command from the CPU 51. When the received image data is to be read out from the RAM 53, similarly, read time data is added to the to-be-read image data. The recorder unit 56 prints the received image added with the reception time data and the read time data. Therefore, the reception time of the received image data and the print time at the recorder unit 56 can be grasped, troubles in processing of received image data can be prevented, and the received image can be easily discriminated from a printer image.

In the second embodiment, the reception time and the print time are printed at the end of the recorded image. However, a storing start time as the reception time and a read start time as the print time may be printed at the head of the recorded image. Date data may also be printed in addition to the time data. Another mark for discriminating the printer image from the facsimile image may be used in place of the footer mark. In the second embodiment, the reception time data and the read time data are added to the image data by the character generator 55 of the facsimile apparatus. However, the reception time data and the read time data may also be added to the image data by using a character information code in the printer faculty of the apparatus. In this case, the time data can be printed on the print of the received image with a clear and small character style (reduced or small letter) by a font in the printer faculty without any adverse effect.

According to the present invention, when facsimile image data is received in the printer mode, the operator switches the switching means to the facsimile mode. The control means causes the recorder unit to automatically operate such that the image data stored in the image memory in the printer mode is read, and the received image information is printed by the recorder unit. Therefore, even when facsimile image information is received while the recorder unit is operating as a printer for an external signal, the facsimile image information can be properly and quickly printed only by the switching operation to the facsimile mode.

According to the present invention, when facsimile image data is received in the printer mode, the operator switches the switching means to the facsimile mode. After this switching operation, the print operating means for reading and printing the image data stored in the image memory is operated. At this time, the control means causes the recorder unit to perform an output operation such that the image data stored in the image memory in the printer mode is read out, and the received image information is printed. Therefore, the operation is simple. Particularly, when a plurality of operators use the same apparatus, appropriate processing can be performed without confusing the facsimile information with the printer information.

According to the present invention, when the switching means is switched to the facsimile mode, and thereafter, facsimile image data is received in the printer mode, the control means causes the display means to display a message for prompting the output operation of the received image information by the print operating means. Therefore, in addition to the above-described effect, the operator can appropriately perform switching to the facsimile mode and the operation of the print operating means.

According to the present invention, when facsimile image data is received in the printer mode, the operator operates the selecting means to select the first output mode. In this case, upon switching operation to the facsimile mode, the control means causes the recorder unit to operate such that the image data stored in the image memory in the printer mode is read out, and the received image information is automatically printed. If the second output mode is selected, upon operation of the print operating means after switching to the facsimile mode, the received image information according to the image data stored in the image memory in the printer mode is printed. Therefore, in accordance with the use conditions such as use by a plurality of operators and the degree of skill of the operator, the first output mode (automatic recording mode) and the second output mode (normal recording mode) can be appropriately selected to properly use the apparatus.

According to the present invention, when received image data is to be stored in the image memory, reception time data is added to the to-be-stored received image data. When the received image data is to be read from the image memory, read time data is added to the to-be-read received image data. The recorder unit prints the received image added with the reception time data and the read time data. Therefore, the reception time of the received image data and the print time at the recorder unit can be grasped, troubles in processing of the received image data can be prevented, and the received image can be easily discriminated from a printer image.

What is claimed is:

1. A data communication apparatus comprising:

first receiving means for receiving data from an external terminal through an interface;

second receiving means for receiving data through a line different from the interface;

printing means for printing the data received by said first and second receiving means; and adding means for adding a predetermined mark to data to be printed by said printing means, wherein the mark added by said adding means is for discriminating the data received by said first receiving means and the data received by said second receiving means when both sets of data are printed by said printing means, and wherein said adding means adds a time of reception of when the data was received by said second receiving means, and a time of printing of when the data received by said second receiving means was printed by said printing means, these times of reception and printing also being for discriminating the data received by said first receiving means from the data received by said second receiving means, and these times of reception and printing being together printed on the same face of a recording sheet.

2. An apparatus according to claim 1, wherein said printing means visually prints data received by said first and second receiving means, by using a printing agent, and the mark added by said adding means is for detecting the presence/absence of the printing agent.

3. An apparatus according to claim 1, wherein said adding means adds the mark to the data received by said second receiving means.

4. A control method of controlling a data communication apparatus comprising:

a first receiving step, of receiving data from an external terminal through an interface;

a second receiving step, of receiving data through a line different from the interface;

a recording step, of printing the data received in said first and second receiving steps; and an adding step, of adding a predetermined mark to data to be printed in said recording step, wherein the mark added in said adding step is for discriminating the data received in said first receiving step from the data received in said second receiving step when both sets of data are printed in said printing step, and a time of reception, of when the data was received in said second receiving step, is added in said adding step and a time of printing of when the data received in said second receiving step is printed in said recording step, the time of reception and printing also being for discriminating the data received in said first receiving step from the data received in said second receiving step, and these times of reception and printing being together printed on the same face of a recording sheet.

* * * * *

UNITED STATES PATENT AND TRADEMARK OFFICE
CERTIFICATE OF CORRECTION

PATENT NO. : 6,775,021 B1
DATED : August 10, 2004
INVENTOR(S) : Takeshi Ono

It is certified that error appears in the above-identified patent and that said Letters Patent is hereby corrected as shown below:

Title page,
Item [56], References Cited, FOREIGN PATENT DOCUMENTS,
"5473510" should read -- 54-73510 --.
"5546604" should read -- 55-46604 --.
"55115771" should read -- 55-115771 --.

Signed and Sealed this

Twenty-fourth Day of January, 2006

JON W. DUDAS
*Director of the United States Patent and Trademark Office*